United States Patent
Böhm

(10) Patent No.: US 7,548,807 B2
(45) Date of Patent: Jun. 16, 2009

(54) METHOD FOR STEERING A VEHICLE WITH SUPERIMPOSED STEERING

(75) Inventor: Jürgen Böhm, Oberneisen (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 778 days.

(21) Appl. No.: 10/519,886

(22) PCT Filed: Jul. 3, 2003

(86) PCT No.: PCT/EP03/07107

§ 371 (c)(1),
(2), (4) Date: Dec. 30, 2004

(87) PCT Pub. No.: WO2004/005111

PCT Pub. Date: Jan. 15, 2004

(65) Prior Publication Data
US 2005/0251310 A1    Nov. 10, 2005

(30) Foreign Application Priority Data

Jul. 5, 2002 (DE) ................. 102 30 265
Jun. 25, 2003 (DE) ................. 103 28 752

(51) Int. Cl.
*B62D 5/04* (2006.01)
*B60W 30/02* (2006.01)
(52) U.S. Cl. .............. 701/41; 701/48; 701/70; 180/402; 180/446; 180/443; 318/34; 303/146
(58) Field of Classification Search .......... 701/42, 701/43; 180/410
See application file for complete search history.

(56) References Cited

U.S. PATENT DOCUMENTS

| | | | | |
|---|---|---|---|---|
| 5,205,371 A | * | 4/1993 | Karnopp | 180/444 |
| 5,853,064 A | * | 12/1998 | Hackl et al. | 180/422 |
| 6,184,637 B1 | * | 2/2001 | Yamawaki et al. | 318/432 |
| 6,226,579 B1 | * | 5/2001 | Hackl et al. | 701/41 |
| 6,226,581 B1 | * | 5/2001 | Reimann et al. | 701/48 |
| 6,516,916 B2 | * | 2/2003 | Segawa et al. | 180/444 |
| 6,550,871 B1 | * | 4/2003 | Bohm et al. | 303/20 |
| 7,168,520 B2 | * | 1/2007 | Weeber et al. | 180/443 |
| 2004/0084241 A1 | * | 5/2004 | Niessen et al. | 180/446 |

FOREIGN PATENT DOCUMENTS

| | | |
|---|---|---|
| DE | 197 51 125 A1 | 9/1998 |
| DE | 197 51 397 A1 | 9/1998 |
| DE | 197 49 005 A1 | 1/1999 |
| EP | 0 778 660 A2 | 6/1996 |

\* cited by examiner

*Primary Examiner*—Thomas G Black
*Assistant Examiner*—Lin B Olsen
(74) *Attorney, Agent, or Firm*—RatnerPrestia

(57) ABSTRACT

A method of steering a vehicle with a superimposed steering system, wherein a steering angle input by the driver and an additional angle (additional steering angle) is determined and wherein the additional steering angle can override the input steering angle according to further quantities, in particular diving-dynamics quantities, by means of an electric motor, is characterized in that the method includes a steering angle control with a subordinated current or torque control of the electric motor.

11 Claims, 6 Drawing Sheets

METHOD FOR STEERING A VEHICLE WITH SUPERIMPOSED STEERING

TECHNICAL FIELD

The invention relates to a method of steering a vehicle with a superimposed steering system, wherein a steering angle input by the driver and an additional angle (additional steering angle) is determined and wherein the additional steering angle can override the input steering angle according to further quantities, in particular diving-dynamics quantities, by means of an electric motor.

BACKGROUND OF THE INVENTION

Up-to-date motor vehicles, in particular passenger vehicles, are generally equipped with hydraulic or electrohydraulic servo steering systems, wherein a steering wheel is compulsively coupled mechanically with the steerable vehicle wheels. The servo assistance is devised such that actuators, e.g. hydraulic cylinders, are arranged in the mid-portion of the steering mechanism. A force generated by the actuators assists in the actuation of the steering mechanism in response to the turning of the steering wheel. This reduces the force the driver has to apply during the steering operation.

Superimposed steering systems are known in the art. They are characterized in that the steering angle input by the driver can be overridden in case of need by another steering angle (additional steering angle) by means of an actuator. Usually electric actuators are employed which act on an overriding drive and adjust the additional steering angle largely independently of the driver.

The additional steering angle is controlled by an electronic controller and is e.g. used to increase the stability and agility of the vehicle. According to a prior art control concept, as described in DE 197 51 125 A1, the steering components of the superimposed steering angle are produced irrespective of each other.

BRIEF SUMMARY OF THE INVENTION

An object of the invention is to provide a method of steering a vehicle with a superimposed steering that is safe and reliable in operation.

According to the invention, this object is achieved in that the method includes a steering angle control with a subordinated current or torque control of the electric motor.

To this end, a nominal current or a nominal motor torque is produced by means of which the electric motor introduces an additional steering angle into the steering system. Due to the angle superimposed on the steering actuation, the desired steering angle and, hence, also the additional steering angle is adjusted, which latter is additionally demanded by other vehicle control systems, as the case may be.

It is arranged for in the invention that an actual steering angle value and a nominal steering angle value is determined and, according to a comparison between the actual steering angle value and the nominal steering angle value, a nominal current or a nominal motor torque is produced by which the electric motor introduces the additional steering angle into the steering system.

A favorable embodiment of the method of the invention includes that a steering request of the driver $\delta_{DRV}$ is determined on the basis of a steering wheel angle $\delta_H$ adjusted by the driver, wherein the driver's steering request $\delta_{DRV}$ is composed of the adjusted steering wheel angle $\delta_H$ and an invariably or variably predeterminable gear ratio factor and the gear ratio factor is chosen corresponding to the current driving situation, in particular a detected longitudinal vehicle speed and/or a steering wheel turning angle, and that a nominal steering angle value $\delta_{nominal}$ is determined on the basis of the so calculated steering request of the driver and sent to the steering control.

According to another embodiment of the invention, the driver's steering angle $\delta_H$ is determined and, in connection with a gear ratio factor $i_{L1}$ by which the driver's steering angle acts directly on the steering gear, an additional steering angle $\delta_M$ is additively superimposed thereon in connection with a second gear ratio $i_{L2}$, and a superimposed steering angle $\delta_L$ is determined and sent as an actual value $\delta_{L,actual}$ to the steering control, with said superimposed steering angle $\delta_L$ being determined according to the following formula:

$$\delta_L = i_{L1}*\delta_H + i_{L2}*\delta_M.$$

The invention provides that a driving dynamics control (ESP system) cooperates with the steering control and that an additional steering angle $\Delta\delta$ responsive to driving dynamics is determined when the necessity of a stabilizing intervention is detected by driving dynamics control.

Preferably, the additional steering angle $\Delta\delta$ responsive to driving dynamics that is produced on the basis of a correcting intervention of a driving dynamics controller is additively superimposed on the driver's steering request $\delta_{DRV}$.

The control of the superimposed steering is improved by this embodiment of the method of the invention in particular in highly dynamic driving situations. The term 'highly dynamic driving situation' refers to all driving situations with a relatively quick change of the vehicle direction and/or the vehicle speed, which can cause instability of the vehicle or the desired vehicle movement. Driving situations in the frontier of driving dynamics, such as skidding maneuvers, demand too much from many drivers regarding a suitable steering performance.

It is arranged for by the invention that based on the series steering ratio $i_{L,series}$ and due to a boosting factor K1 responsive to a steering wheel angle and a boosting factor K2 responsive to the vehicle speed, a resulting steering ratio $I_{L,ESAS}$ which corresponds to the ratio between the steered wheels $\delta_V$ and the driver's steering angle $\delta_H$ is determined according to the following formula:

$$i_{L,ESAS} = \delta_V/\delta_H = i_{L,series}/(K1*K2)$$

According to the invention, an anticipatory control of the nominal speed of the motor $\omega_{M,nominal}$ is executed, which is determined from a motor speed specification $\omega_{M,spec}$ and a motor speed preset value $\omega_{M,reg}$, and the motor speed preset value $\omega_{M,reg}$ is determined on the basis of a comparison between a nominal steering angle value $\delta_{L,nominal}$ and a determined actual steering angle value $\delta_{L,actual}$, and the motor speed specification $\omega_{M,spec}$ is determined from the time derivative of the nominal steering angle value $\delta_{L,nominal}$ and the driver's steering angle $\delta_H$ and a gear ratio factor $i_{L2}$ by means of the following formula:

$$\omega_{M,spec} = (\dot\delta_{L,nominal} - i_{L1}\dot\delta_H)/i_{L2}.$$

According to the invention, the control of the motor of the superimposed steering is realized by a computer program which includes appropriate program steps for implementing the described method.

The above object is also achieved by a steering system for a vehicle, comprising a steering wheel arranged at a steering column, a steering gear, a steering angle sensor arranged at the steering column, an overriding motor that acts on the steering column by way of an overriding gear, an electric steering control element, a sensor for measuring the position of the steered wheels, and a steering control device, in which steering system the steering control device includes a means for implementing the method of the invention described hereinabove.

DETAILED DESCRIPTION OF THE PREFERRED EMBODIMENTS

Figure 1:
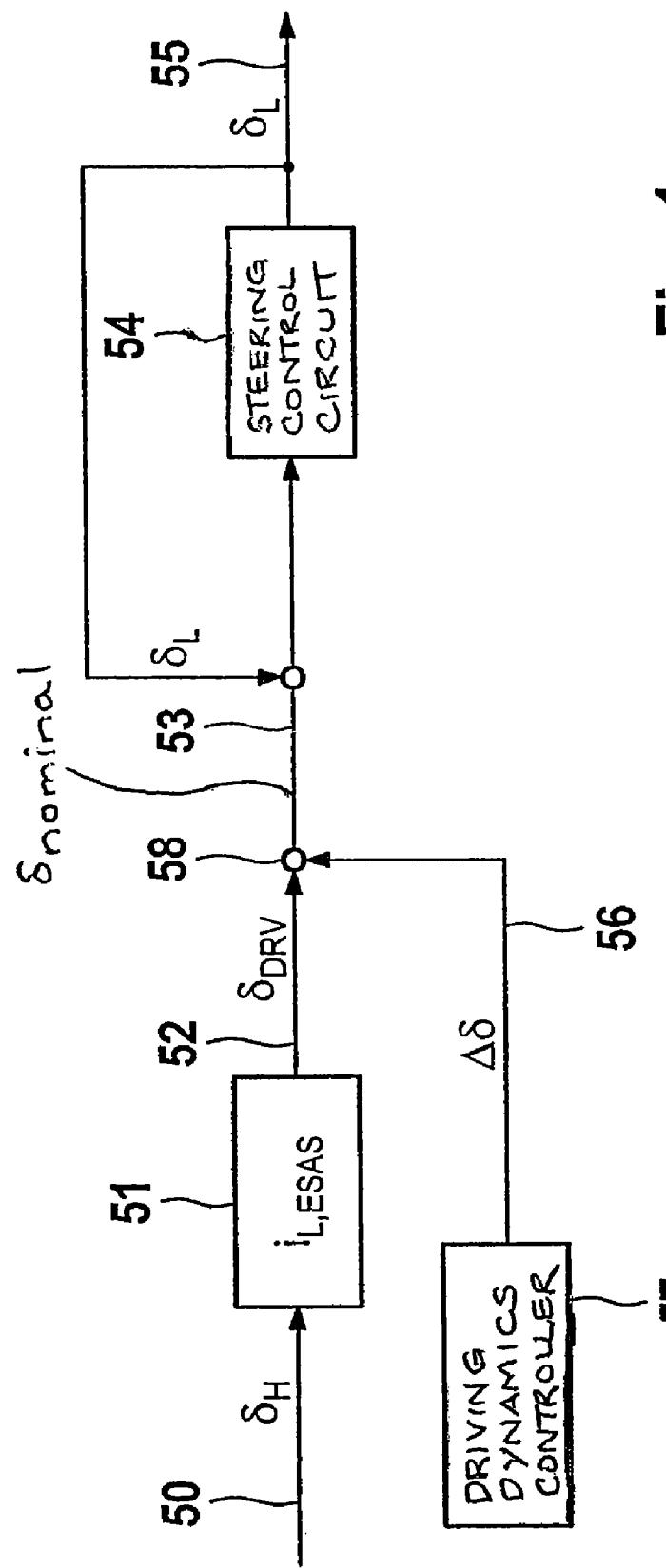
FIG. 1 is a block diagram of the basic structure of the method of the invention.

The basis structure of the method of the invention is represented in FIG. 1.

Based on the steering wheel angle $\delta_H$ 50 adjusted by the driver, the driver's steering request $\delta_{DRV}$ 52 is calculated in the basic steering function as a nominal steering angle value 53 $\delta_{L,nominal}$ (input quantity) for the steering control circuit 54 by way of a variably or invariably predeterminable gear ratio $i_{L,ESAS}$ 51. In this arrangement, the basic steering function generally comprises the selection of a steering ratio $i_{L,ESAS}$ corresponding to the current driving situation, e.g. the detected longitudinal vehicle speed. The actuator of the steering system is then driven corresponding to a steering angle $\delta_L$ 55 (output quantity of the control circuit 54).

Driving stability and agility of the vehicle can be enhanced by means of adapting the position of the steered wheels, principally irrespective of the driver's request. To this end, an additional steering angle $\Delta\delta$ 56 responsive to driving dynamics is additively superimposed 58 on the driver's steering request $\delta_{DRV}$ 52 on the basis of a correcting intervention of a driving dynamics controller 57. The result is the nominal steering angle value $\delta_{L,nominal}$.

Figure 2:
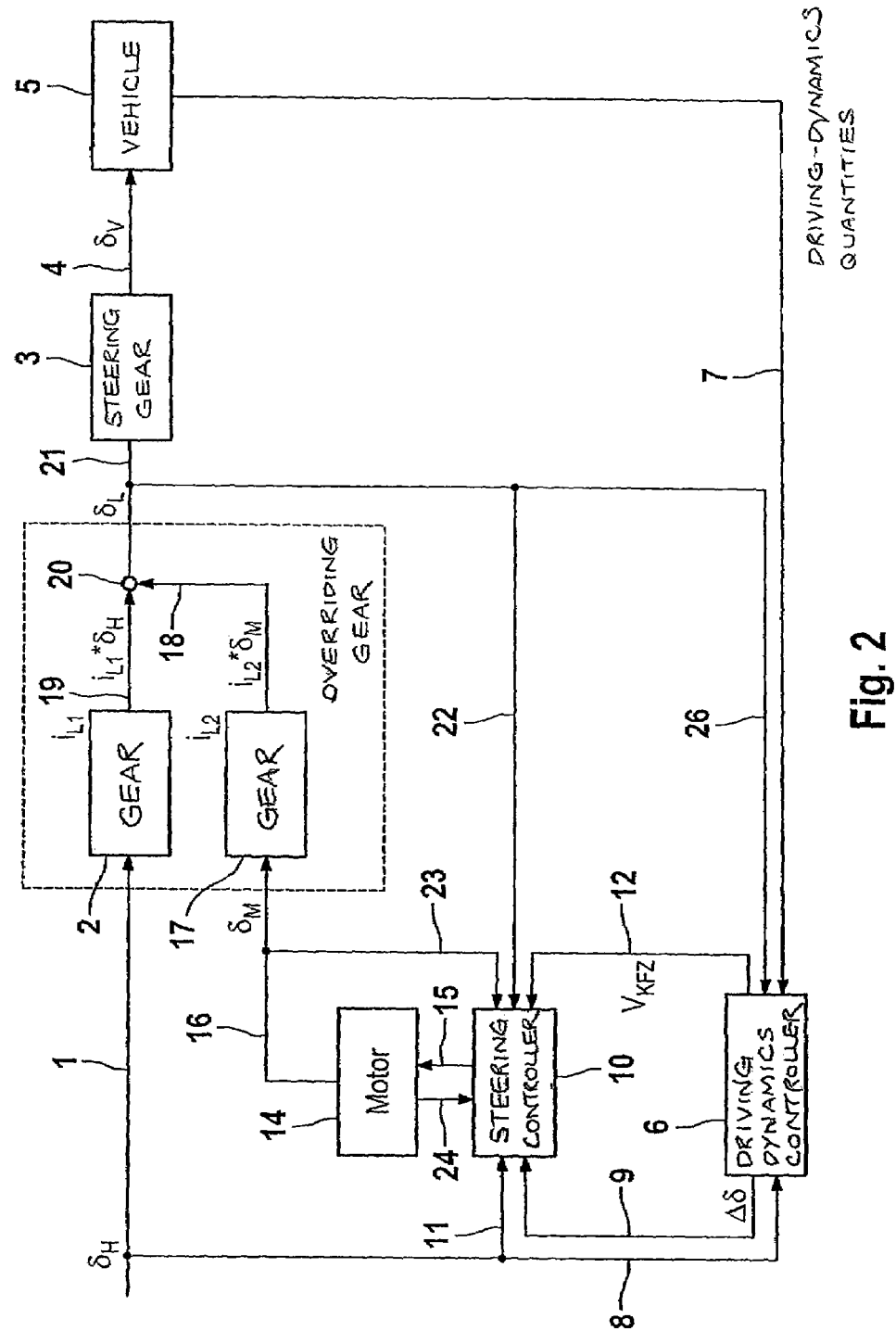
FIG. 2 is a block diagram of the structure of the method of the invention.

FIG. 2 shows the structure of the method. The driver's steering angle $\delta_H$ acts in the overriding gear as an input quantity 1 by way of a mechanical gear 2 with a gear ratio factor $i_{L1}$ directly on the steering gear 3 ($i_{L1}*\delta_H$) 19. The additional steering angle $\delta_M$ 16 adjusted by a motor acts by way of a second gear 17 with a gear ratio factor $i_{L2}$ and is additively superimposed on the geared steering angle of the driver:

$$\delta_L = i_{L1}*\delta_H + i_{L2}*\delta_M.$$

The steering gear 3 generates as an output quantity a resulting steering angle $\delta_V$ that acts upon the vehicle.

The driving dynamics of the vehicle 5, especially the yaw torque about the vertical axis of the vehicle 5, and the transverse acceleration are determined. The driving-dynamics quantities 7 and the driver's steering angle $\delta_H$ 8 are sent as input quantities to a driving dynamics controller 6. Driving-dynamics-related steering interventions in the capacity of an additional steering angle $\Delta\delta$ 9 are sent as an input quantity to a steering controller 10 by means of the driving dynamics controller 6. Likewise, the driver's steering angle $\delta_H$ 11 and a value for the present vehicle speed 12, in particular the vehicle reference speed from the driving dynamics controller 6 or an ABS controller, is sent as an input quantity to the steering controller 10. Said steering controller 10 drives the actuator 14 of the overriding steering function 15.

The actuator, in particular an electric motor 14, produces an additional steering angle $\delta_M$, which acts by way of a gear 17 with a gear ratio factor $i_{L2}$ on the steering gear 3 ($i_{L2}*\delta_M$) 18. Gear 2 and gear 17 are illustrated herein as two individual 'gears' only for representation purposes. However, the two gear ratios of gears 2 and 17 are preferably realized by way of one single gear unit, in particular a planetary gear.

As can be taken from FIG. 1 already, the additional steering angle $\Delta\delta$ which shall be considered as an external intervention of the driving dynamics controller 6 is additively superimposed at 58 on the nominal steering angle $\delta_{DRV}$ of the basic steering function. The nominal steering angle value $\delta_{L,nominal}$ resulting from this addition is sent to the control of the superimposed steering.

A sum steering angle $\delta_L$ 21 is the result of the additive superposition of driver's steering angle and superimposed steering angle generated by the actuator, from which sum steering angle a resulting steering angle $\delta_V$ is produced by the steering gear 3 as a resulting output quantity and acts on the vehicle corresponding to the desired learning function.

The sum steering angle $\delta_L$ 21 is furnished to the steering controller 10 as an input quantity at 22, just as the additional steering angle $\delta_M$ 23. The sum steering angle $\delta_L$ 21 is also sent 26 as an input quantity to the driving dynamics controller 6. Signals or measured quantities of the actuator means, the electric motor 14, are also sent to the steering controller 10 at 24.

Figure 3:
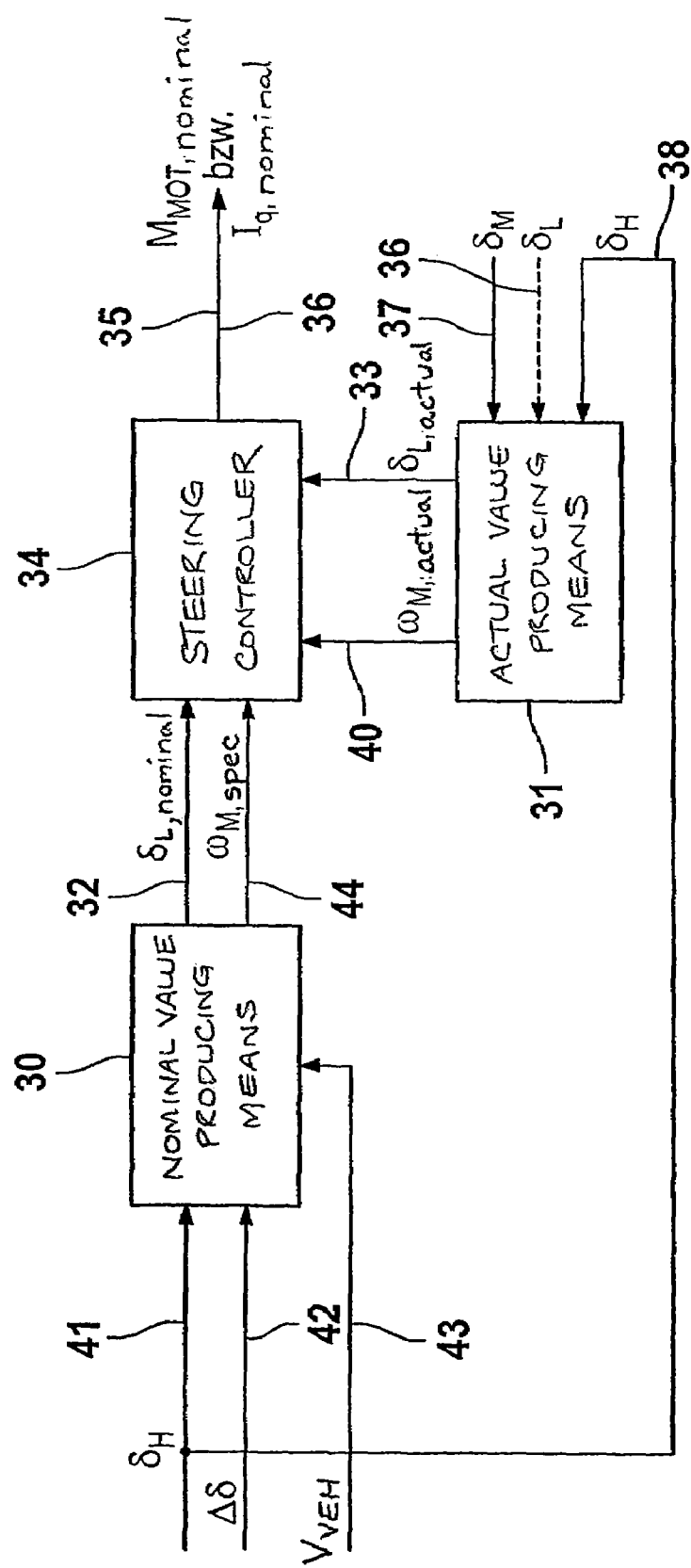
FIG. 3 is a block diagram for determining a nominal value and an actual value as input quantities of the steering angle control according to the invention.

FIG. 3 shows the determination of the nominal steering angle value $\delta_{L,nominal}$ and, if needed, a motor speed specification $\omega_{M,spec}$ 44 in a nominal value producing means 30 and the determination of the actual value $\delta_{L,actual}$ in an actual value producing means 31, said values being used as input quantities 32, 33 of the steering controller 34 under consideration. A motor torque $M_{mot,nominal}$ 35 to be adjusted or a torque-producing motor current $1_{q,nominal}$ is produced from output quantities. These quantities are associated with the electric motor, exactly as a commutation of the motor (in the case of an electronic commutation).

In this arrangement, the control quantity of the steering controller 34 is the steering angle $\delta_L$, which is either directly measured and sent 36 to the actual value producing means 31, or which can be calculated in the actual value producing means 31 by means of the motor angle $\delta_M$ 37 and the driver's steering angle $\delta_H$ 38 in consideration of the gear ratio of the overriding gear. The motor speed $\omega_{M,actual}$ 40 which can be calculated from the measured motor angle by differentiation is used as internal control quantity.

The driver's steering angle $\delta_H$ 41 and the additional steering angle $\Delta\delta$ 42 and the vehicle speed $V_{VEH}$ 43 are also sent to the nominal value producing means.

Figure 4:
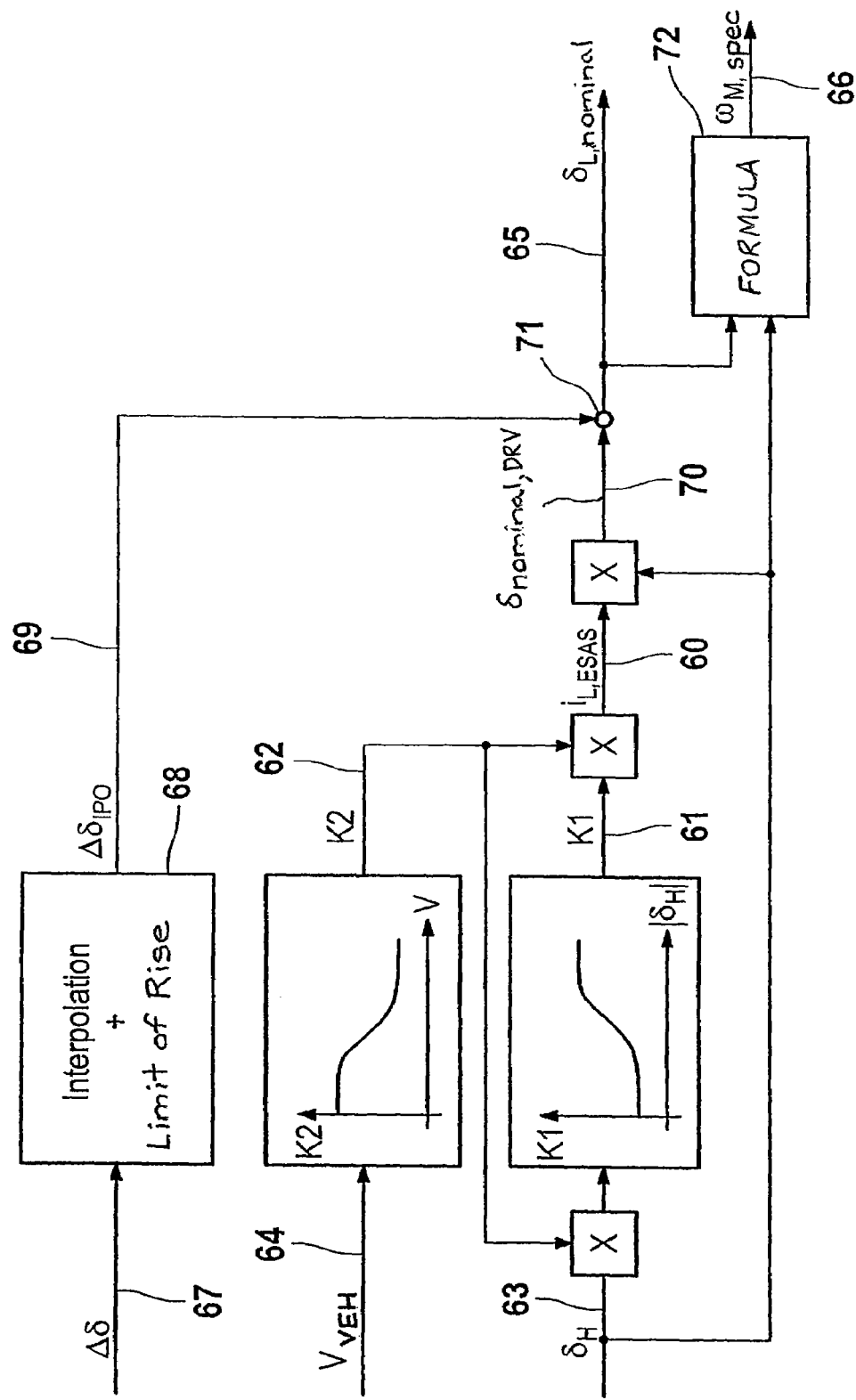
FIG. 4 is a block diagram for determining a nominal value and an actual value as input quantities of the steering angle control according to the invention.

FIG. 4 shows the determination of the nominal steering angle $\delta_{L,nominal}$ 32 in greater detail.

The resulting steering ratio $i_{L,ESAS}$ 60 corresponds to the ratio between the angle of the steered wheels (wheel turning angle) $\delta_V$ and the driver's steering angle $\delta_H$. It results from two boosting factors K1 61 and K2 62 which are multiplicatively combined with the series steering gear ratio $i_{L,series}$ by the following formula:

$$i_{L,ESAS}=\delta_V/\delta_H=i_{L,series}/(K1*K2)$$

The boosting factors represent a component K1 responsive to the steering wheel angle 63 and a component K2 responsive to the vehicle speed 64. They can be chosen freely according to aspects related to driving dynamics or specifications by the driver. To calculate the nominal steering angle value $\delta_{L,nominal}$ and the motor speed specification $\omega_{M,spec}$ 66, the additional steering angle $\Delta\delta$ 67 is also taken into consideration, and a corrected additional steering angle $\Delta\delta_{IPO}$ 69 is superimposed at 71 on the driver's request $\delta_{nominal,DRV}$ 70 after an interpolation and limitation of rise 68.

The motor speed specification $\omega_{M,spec}$ 66 is calculated from the time derivative of the nominal steering angle value $\delta_{L,nominal}$ and the steering angle of the driver $\delta_H$ by the following formula 72:

$$\omega_{M,spec}=(\dot{\delta}_{L,nominal}-i_{L1}\dot{\delta}_H)/i_{L2}.$$

Figure 5:
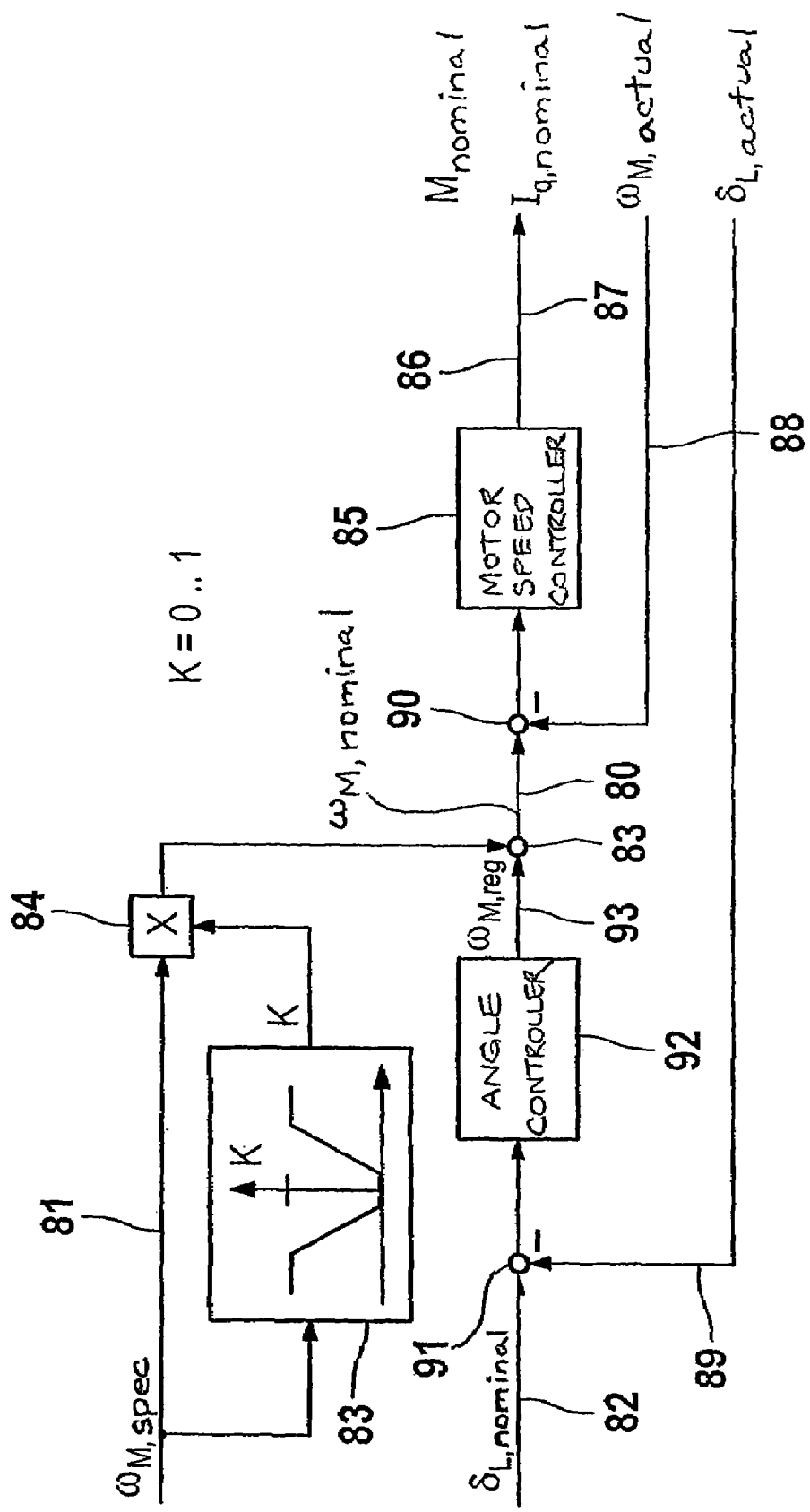
FIG. 5 is a block diagram for determining a motor torque specification for the electric motor for adjusting the overriding angle according to the invention.

FIG. 5 shows the steering angle control in greater detail. Said control is a cascade control in its basic structure. An anticipatory control of the nominal speed of the motor is executed to enhance the dynamics of the control circuit. The nominal speed $\omega_{M,nominal}$ is produced 83 from the motor speed specification $\omega_{M,spec}$ 81 and the motor speed preset value $\omega_{M,reg}$ 93 being determined as an output quantity of the angle controller based on the comparison between the nominal steering angle value $\delta_{L,nominal}$ and the actual steering angle value $\delta_{L,actual}$ determined. To prevent impairment of the steering comfort by the anticipatory control especially during slow steering movements, the anticipatory control value is weighted depending on the desired motor speed at 83, 84.

The nominal motor torque $M_{mot,nominal}$ 86 or a torque-producing nominal motor current $I_{q,nominal}$ 87 by which the motor shall be driven, is produced from the nominal speed $\omega_{M,nominal}$ 80 and the comparison with the actual motor speed $\omega_{M,actual}$ 88 determined by way of a motor speed controller 85.

Figure 6:
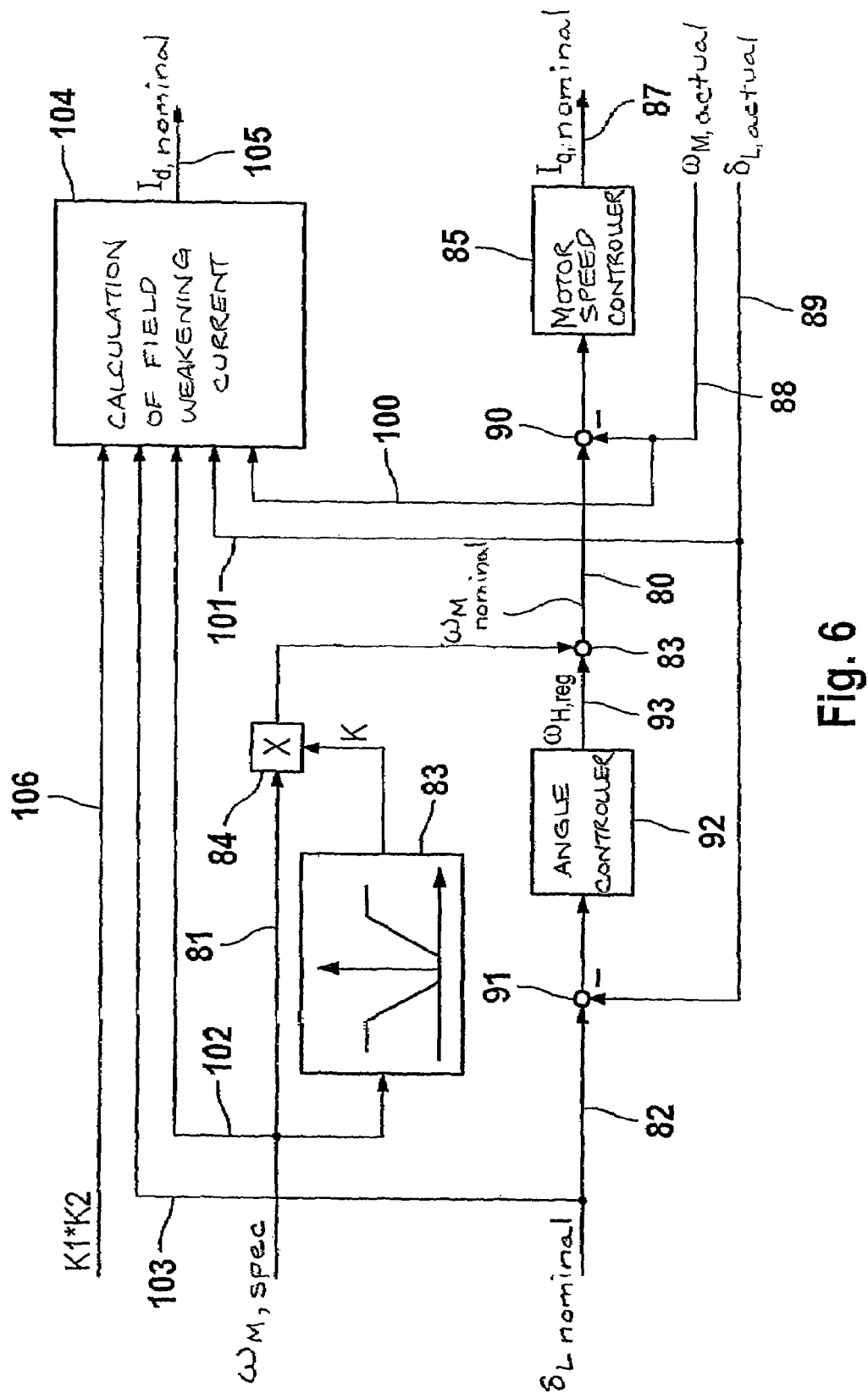
FIG. 6 is a block diagram for determining a field weakening current and a nominal current for actuating the electric motor according to the invention.

A higher motor speed than available may be required in certain cases of operation. In this case, a demand-responsive brief increase of the motor speed without reduction of the available motor torque can be reached by using a field weakening. A brief increase of the current consumption is related thereto. In particular the existence of a very direct steering ratio and a high nominal speed on the part of the driver or the driving dynamics control system is considered as a case of need. The resulting controller structure represents an extension of the structure shown in FIG. 5 and is illustrated in FIG. 6. Therefore, all steps and elements corresponding to FIG. 5 have been assigned equal reference numerals in FIG. 6 and will not be explained in detail in the following.

A decision about the use of the field weakening and the magnitude of the field weakening current is taken 104 based on the present actual condition of the steering system, that means the prevailing actual motor speed $\omega_{M,actual}$ 100 and the prevailing steering angle value $\delta_{L,actual}$ 101 as well as the desired nominal condition, i.e. the motor speed specification $\omega_{M,spec}$ 102 and the nominal steering angle value $\delta_{L,nominal}$ 103 and the boosting factors of the steering ratio 106. In case field weakening of the motor is not necessary, the resulting field weakening current $I_{d,nominal}$ 105 is zero, i.e. 0 A. The torque control of the electronically commutated motor is then required to control the field-weakening current value Id in addition to the torque-producing current Iq 87.

The invention claimed is:

1. A method of steering a vehicle with a superimposed steering system comprising;
   inputting a steering angle by the driver;
   determining an additional steering angle wherein the additional steering angle can override the input steering angle according to further quantities, through an electric motor;
   providing a steering angle control with a subordinated current or torque control of the electric motor;
   executing an anticipatory control of a nominal speed of the motor $\omega_{M,nominal}$, determined from a motor speed specification $\omega_{M,spec}$ and a motor speed present value $\omega_{M,reg}$, by:
   determining the motor speed preset value $\omega_{M,reg}$ by comparing a nominal steering angle value $\delta_{L,nominal}$ and a
   determined actual steering angle value $\delta_{L,Actual}$, and
   determining the motor speed specification $\omega_{M,spec}$ from the time derivative of the nominal steering angle value $\delta_{L,nominal}$ and the driver's steering angle $\delta_H$ and a gear ratio factor $I_{L2}$ by means of the following formula:

$$\omega_{M,spec}=(\dot{\delta}_{L,nominal}-I_{L1}\dot{\delta}_H)/I_{L2}.$$

2. The method as claimed in claim 1, wherein an actual steering angle value and a nominal steering angle value is determined and, according to a comparison between the actual steering angle value and the nominal steering angle value, a nominal current or a nominal motor torque is produced by which the electric motor introduces the additional steering angle into the steering system.

3. The method as claimed in claim 1, wherein a steering request of the driver $\delta_{DRV}$ is determined on the basis of a steering wheel angle $\delta_H$ adjusted by the driver, and wherein the driver's steering request $\delta_{DRV}$ is composed of the adjusted steering wheel angle $\delta_H$ and an invariably or variable predeterminable gear ratio factor and the gear ratio factor is chosen corresponding to the current driving situation, and wherein a nominal steering angle value $\delta_{nominal}$ is determined on the basis of the so calculated steering request of the driver and sent to the steering control.

4. The method as claimed in claim 1, wherein the driver's steering angle $\delta_H$ is determined and, in connection with a gear ratio factor $i_{L1}$ by which the driver's steering angle acts directly on the steering gear, an additional steering angle $\delta_M$ is additively superimposed thereon in connection with a second gear ratio $i_{L2}$, and wherein a superimposed steering angle $\delta_L$ is determined and sent as an actual value $\delta_{L,actual}$ to the steering control, with said superimposed steering angle $\delta_L$ being determined according to the following formula:

$$\delta_L=i_{L1}*\delta_H+i_{L2}*\delta_M.$$

5. The method as claimed in claim 1, wherein a driving dynamics control (ESP system) cooperates with the steering control, and wherein an additional steering angle $\Delta\delta$ responsive to driving dynamics is determined when the necessity of a stabilizing intervention is detected by driving dynamics control.

6. The method as claimed in claim 1, the method further comprising a driving dynamics control (ESP system) cooperates with the steering control, and an additional steering angle $\Delta\delta$ responsive to driving dynamics is determined when the necessity of a stabilizing intervention is detected by driving dynamics control, wherein the additional steering angle $\Delta\delta$ responsive to driving dynamics that is produced on the basis of a correcting intervention of a driving dynamics controller is additively superimposed on the driver's steering request $\delta_{DRV}$.

7. The method as claimed in claim 1, wherein the electric motor is additionally actuated by means of a field weakening current according to further quantities, with a view to increasing the motor speed without reduction of the available motor torque.

8. The method as claimed in claim 1, the method further comprising the electric motor is additionally actuated by means of a field weakening current according to further quantities, with a view to increasing the motor speed without reduction of the available motor torque, wherein the electric motor is additionally actuated by means of a field weakening current when a very direct steering ratio and/or a high nominal speed is desired or required.

9. The method as claimed in claim 1, wherein based on the series steering ratio $i_{L,series}$ and due to a boosting factor K1 responsive to a steering wheel angle and a boosting factor K2 responsive to the vehicle speed, a resulting steering ratio $I_{L,ESAS}$ which corresponds to the ratio between the steered wheels $\delta_v$ and the driver's steering angle $\delta_H$ is determined according to the following formula:

$$i_{L,ESAS}=\delta_v/\delta_H=i_{L,series}/(K1*K2).$$

10. A system comprising an electric motor operating under a computer executing computer program instructions encoded on a controller:

the system operable to implement the instructions that steer a vehicle with a superimposed steering system, wherein a steering angle input by a driver and an additional steering angle is determined and wherein the additional steering angle can override the input steering angle according to further quantities, through an electric motor, wherein the system includes a steering angle control with a subordinated current or torque control of the electric motor, and where an anticipatory control of the nominal speed of the motor $\omega_{M,nominal}$, is executed in the computer program instructions, the nominal speed of the motor is determined from a motor speed specification $\omega_{M,spec}$ and a motor speed present value $\omega_{M,reg}$ and the motor speed preset value $\omega_{M,reg}$ is determined on the basis of a comparison between the nominal steering angle value $\delta_{L,nominal}$ and a determined actual steering angle $\delta_{L,Acctual}$, and the motor speed specification $\omega_{M,spec}$ is determined from the time derivative of the nominal steering angle $\delta_{L,nominal}$ and the drivers steering angle $\delta_H$ and a gear ratio factor $I_{L2}$ using the following formula:

$$\omega_M = (\delta_{L,nominal} - I_{L1}\delta_H)/I_{L2}.$$

11. A computer executing the instructions set forth in the method as claimed in any one of the claims 1-9.

* * * * *